Sept. 22, 1936.  S. SVENSON  2,054,957
MOTOR STARTING SWITCH
Filed Sept. 11, 1933
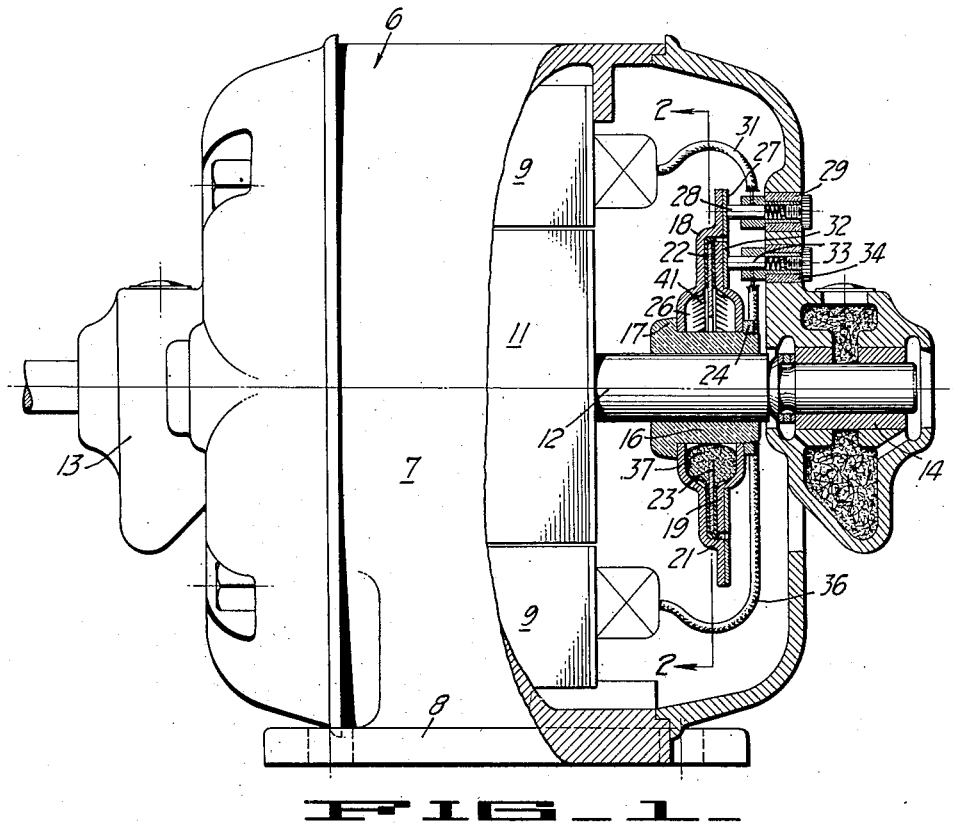
FIG_1_
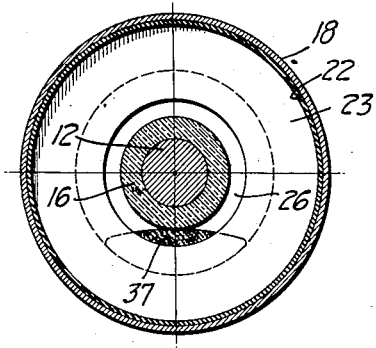 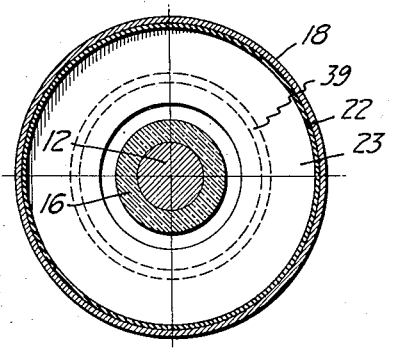
FIG_2_  FIG_3_
INVENTOR.
Sven Svenson
BY
White, Prost, Flehr & Lothrop
ATTORNEYS.

Patented Sept. 22, 1936

2,054,957

UNITED STATES PATENT OFFICE 2,054,957

MOTOR STARTING SWITCH

Sven Svenson, San Francisco, Calif.

Application September 11, 1933, Serial No. 688,955

4 Claims. (Cl. 200—80)

My invention relates to means for controlling electric circuits and is especially concerned with a switch which is responsive to rotational or centrifugal force.

An object of my invention is to provide an improved electrical switch.

A further object of my invention is to provide an inexpensive and compact switch especially for use in starting electric motors.

Another object of my invention is to improve in general centrifugally-operated electrical switches.

The foregoing and other objects are attained in the embodiment of my invention illustrated in the drawing, in which Figure 1 is a side elevation of an electric motor, a portion being broken away and showing in cross-section the starting switch of my invention incorporated therein.

Figure 2 is a cross-section the plane of which is indicated by the line 2—2 of Figure 1 with my motor starting switch in its stationary condition.

Figure 3 is a cross-section the plane of which is indicated by the line 2—2 of Figure 1 but with the motor starting switch of my invention in rotating condition.

In its preferred form, the motor starting switch of my invention includes a pair of electrically-conducting, mutually-insulated members, together providing a chamber and adapted to be rotated, together with a liquid electrical conductor in the chamber which is adapted to form a thin ring around the inner periphery of the chamber upon rotation thereof, together with an insulating baffle disposed in the chamber and adapted to divide the ring into two portions but adapted to permit the liquid conductor to be undivided when the rotatable members are stationary.

Although the switch of my invention is susceptible to numerous uses, it is particularly advantageous in conjunction with electric motors for starting purposes. For this reason I have illustrated my switch in such environment. The usual electric motor, generally designated 6, includes a stator 7 which is provided with a suitable mounting base 8 supporting electrical coils 9. Located within the stator 7 is a rotor 11 mounted on a through-shaft 12 suitably supported in bearings 13 and 14. In the customary operation of such motor, the coils 9 are utilized in starting, but after the rotor 11 has attained a predetermined speed the coils 9 no longer are necessary and are customarily removed from the electrical circuit.

In order to accomplish this result, I preferably mount on the shaft 12 in a convenient location, a bushing 16 of insulating material which is pressed onto the shaft 12 or otherwise arranged to rotate therewith. Against a shoulder 17 on the bushing 16 is a disc 18 which is preferably formed of metal. Co-operating with the disc or member 18 is a comparable metal disc 19 likewise mounted on the bushing 16. In order that the two members 18 and 19, although of electrically conducting material, may be mutually insulated, I preferably arrange them so that they are peripherally spaced apart to provide an annular insulating groove 21. In addition to such insulation, I preferably dispose between said members 18 and 19 an insulating layer 22 which conveniently is of relatively soft rubber. Further in accordance with my invention, I interpose between the members 18 and 19 and likewise embed in the rubber layer 22, an insulating baffle 23 of planar form and annular configuration. The baffle 23 is tightly clamped in place and the rubber 22 is slightly deformed therearound in order to provide a tight seal by means of a jamb-nut 24 which is threaded on the bushing 16 and clamps the described members between the shoulder 17 and the nut 24, thus providing a chamber 26 which is liquid and gas tight.

I preferably include the members 18 and 19 in an electrical circuit, and for this reason the member 18, for instance, carries an annular ring 27 which is in electrically-conducting union with the member 18 and is adapted to be abutted by a brush 28 carried in a suitable holder 29 and connected in an electrical circuit to the coils 9 by a lead 31. Comparably, the member 19 carries a conducting ring 32 which is in electrical union with the member 19 and against which a suitable brush 33 abuts. The brush is carried in a suitable holder 34 included in circuit with the coils 9 by a conductor 36. The described circuit is therefore complete except for the gap between the members 18 and 19.

In order that such gap may be suitably bridged, I dispose within the chamber 26 a quantity of a liquid electrical conductor, such as mercury 37, in such an amount that when the device as a whole is stationary the mercury forms a pool in the bottom of the chamber 26, as indicated in Figure 2, the dimensions or volume of the pool being such that the mercury or other conductor bridges across the baffle 23 and completes the circuit between the conducting members 18 and 19. The quantity of mercury 37, however, is such, or, looked at from another aspect, the height or dimension of the baffle 23 is such, that when the shaft 12 is rotated and attains a predetermined speed the mercury 37 is thrown by centrifugal force radially outward to form a ring 39 on the inner periphery of the chamber 26, so that the mercury is divided into two isolated portions by the baffle 23, each portion, however, still being in electrical union with its associated member 18 or 19. Thus, the electrical circuit is broken in the mercury upon attainment of a predetermined shaft speed. Since mercury is relatively heavy and possesses a high inertia, in certain instances I provide a roughened surface 41 on the interior of the chamber 26 in order that the mercury will be impelled to rotate with the members 18 and 19 and will be thrown outwardly by centrifugal force into the thin film or ring 39.

When the shaft 12 drops below a predetermined speed, or becomes stationary, the ring of mercury 39 by gravity drops into a pool 37, as indicated in Figure 2, again bridging the baffle 23 and replacing the coils 9 in circuit for a subsequent start of the motor or for operation thereof below a predetermined speed.

It is to be understood that I do not limit myself to the form of the motor starting switch shown and described herein, as the invention, as set forth in the following claims may be embodied in a plurality of forms.

I claim:

1. A motor starting switch comprising a rotatable shaft, a pair of electrically conducting members on said shaft forming a chamber therearound and insulated from each other, means for including said members in an electric circuit, an insulating baffle dividing said chamber into compartments, and a liquid electrical conductor in said chamber in sufficient quantity to bridge said baffle when said shaft is stationary but adapted to be separated by said baffle under the influence of centrifugal force when said shaft is rotating.

2. A motor starting switch comprising a pair of rotatable electrically conducting mutually insulated members forming a chamber, a liquid electrical conductor in said chamber adapted to form a thin ring on the inner periphery of said chamber under the influence of centrifugal force when said members are rotating, and an insulating baffle in said chamber of sufficient size to divide said ring into two parts but of insufficient size to divide said liquid conductor when said members are not rotating.

3. A motor starting switch comprising a rotatable shaft, electrically conducting members on said shaft, mercury when quiescent in contact with said members, and means for dividing said mercury into electrically isolated portions in response to centrifugal force upon rotation of said shaft.

4. A motor starting switch comprising a rotatable container having mercury therein, electrically conducting members electrically communicating with said mercury, and means effective upon rotation of said container for dividing said mercury into two electrically isolated portions in response to centrifugal force.

SVEN SVENSON.